Figure 1:
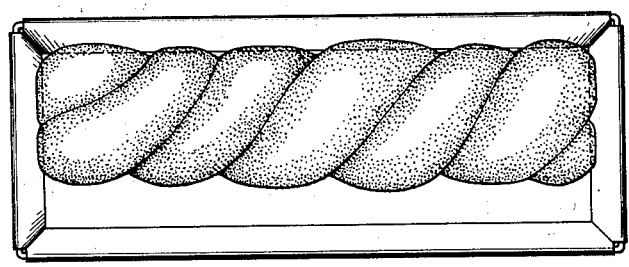

June 30, 1931. D. M. BINGER 1,812,769

PAN LOAF BREAD AND METHOD OF MAKING SAME

Filed Feb. 9, 1931 2 Sheets-Sheet 1

Inventor
Delmar M. Binger

By Barwell & Lagaard
Attorneys

June 30, 1931.    D. M. BINGER    1,812,769
PAN LOAF BREAD AND METHOD OF MAKING SAME
Filed Feb. 9, 1931    2 Sheets-Sheet 2

Inventor
Delmar M. Binger

By Caswell & Lagaard
Attorneys

Patented June 30, 1931

1,812,769

UNITED STATES PATENT OFFICE

DELMAR M. BINGER, OF ST. PAUL, MINNESOTA, ASSIGNOR TO ZINSMASTER BAKING COMPANY, OF MINNEAPOLIS, MINNESOTA, A CORPORATION OF MINNESOTA

PAN LOAF BREAD AND METHOD OF MAKING SAME

Application filed February 9, 1931. Serial No. 514,678.

My invention relates to improvements in pan bread and to the method of making the same.

In making the ordinary pan bread, the customary commercial practice is to roll out a single piece of dough into a roll or strip, the process being usually accomplished in what is known as a molding machine. In this rolled strip of dough the air and gas cells are elongated and disposed generally longitudinally of the strip. The formed strip is placed in a pan and after it has been proofed in a proofing box or chamber, the pan is placed in an oven and the dough baked therein. As the dough raises in being proofed and during its oven spring when first placed in the oven, the cells expand. As the cells expand it is not their tendency to remain or to become further elongated, but on the contrary to become larger in transverse section and and shorter in their longitudinal dimensions. Many of these cells, however, are sufficiently long in the ultimate product that when the loaf is sliced transversely in the ordinary manner said cells form deep pores which extend entirely or nearly through the thickness of a slice. These pores being thus relatively large in transverse section, the bread crumbles readily and is easily fractured in the slice. It dries out quickly in the slice and also in the loaf next to the cut. In the slice the bread appears to be of a darker cast than is actually the case, due to the effect of the shadows in the pores. The texture of the structure, regardless of formula and treatment, is not wholly satisfactory.

My invention has in its contemplation the provision of an improved pan bread of fine texture which is not readily crumbled and fractured in the slice or easily dehydrated in the slice or fractional part of a loaf or which creates the impression that the bread is of dark cast.

It is an object of my present invention to provide a pan bread of improved texture, wherein the cells of the structure are unusually elongated and extend helically lengthwise of the load in turns of low pitch.

A further object of the invention is to provide a simple, effective and relatively inexpensive method of producing pan bread having the characteristics above noted.

In producing my improved pan bread in accordance with the method of my invention two relatively slender strips or rolls of dough taken from a molding machine are twisted together like the strands of a rope. These twisted strips or strands are placed in a pan and subjected to a proofing process in the ordinary proofing box or chamber. Next, the proofed dough, in its pan, is placed in the baking oven where initially further raising known as "oven spring" takes place. Upon this raising of the dough the cells in the expanding structure are constantly further elongated due to the stretching of the twisted strands, one pulling upon the other, said cells in their process of elongation become smaller in transverse section and the walls thereof become stretched in a manner producing a fine smooth and delicate texture in the structure. In raising, the twisted dough is confined at the bottom, sides and ends of the pan containing the same, a considerable part of the dough rising out of the pan. The twisted dough being thus confined, except at the top, the pitch of the turns of the twist progressively diminishes, finally assuming a very low pitch.

A pan loaf embodying my invention is shown in the accompanying drawings, together with illustrations portraying the development of the loaf.

Figure 3:
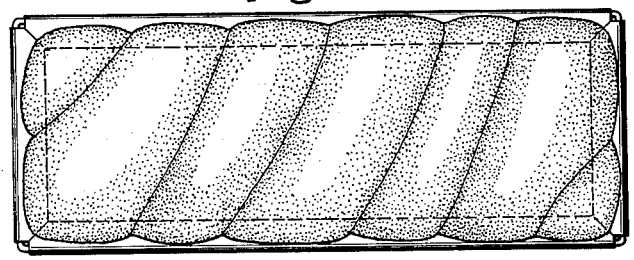
Figure 5:
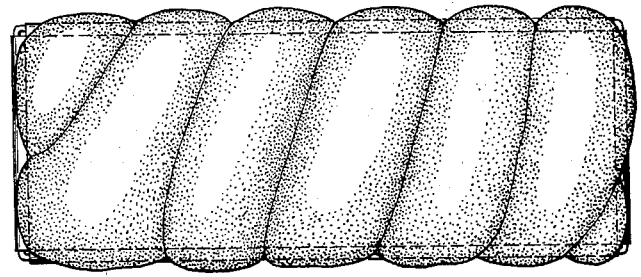
Figure 2:
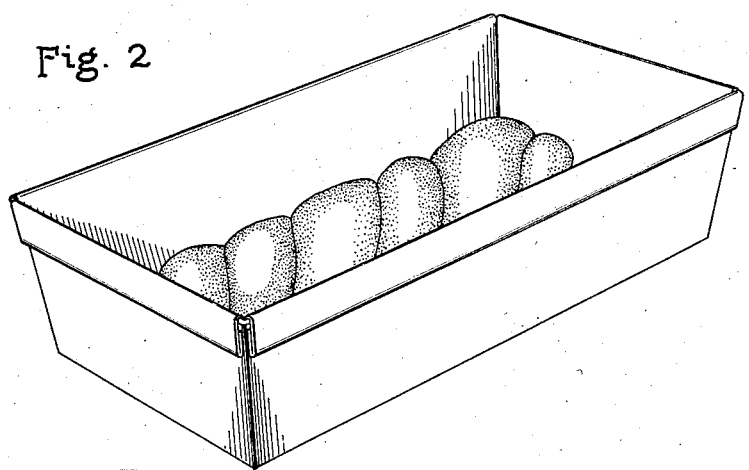
Figure 6:
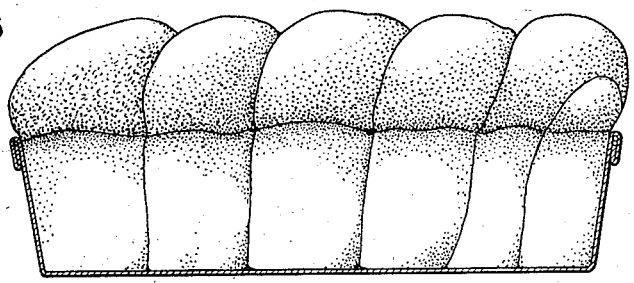

Fig. 1 is a plan view and Fig. 2 is a perspective view illustrating a pan and twisted strands of dough therein; Fig. 3 is a plan view and Fig. 4 a perspective view showing the twisted dough as it appears in the pan after treatment in the proofing box; Fig. 5 is a plan view of the loaf as it appears after coming from the oven and Fig. 6 is an elevational view of the loaf in its pan, the pan being shown in section.

Figure 4:
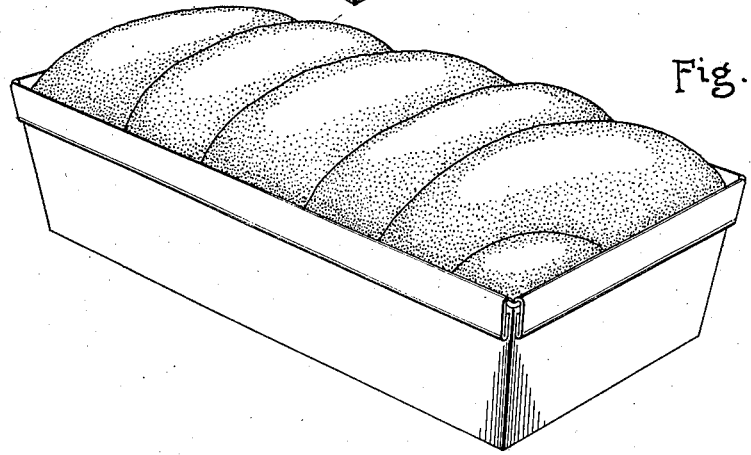

In molding the strips or strands of dough of the slenderness required, the cells are effectively elongated longitudinally of the strand. The strands are twisted together as shown in Fig. 1 of the drawings, in suitable manner, preferably by crossing two strands and twisting them one upon the other from the opposite ends thereof, the length of the twist being substantially that of the pan in which the dough is to be proofed and baked. Figs. 3 and 4 show that the pitch of the twisted strands is substantially diminished in the proofing process and Figs. 5 and 6 show a further diminution of the pitch of said strands as a result of the "oven spring" experienced at the beginning of the baking process. With the turns of the strands in the ultimate product low pitched, as explained, the cellular structure is such that a slicing blade severing the loaf transversely in any plane cuts substantially lengthwise of the slender cells.

From the foregoing it will be apparent that the improved bread structure embodies decidedly advantageous features. The texture of the structure is smooth and delicate. The slicing of the loaf transversely is readily accomplished without fracturing either loaf or slice. The slender cells in the slice extend substantially in the plane thereof and do not form deep pores or holes therein. The structure so constituted does not readily dry out nor is the lightness of its color detracted from by reason of shadows cast in deep recesses. My method of producing the bread is carried out without objectionably disturbing the ordinary routine and at very little additional cost, such added cost being confined almost entirely to labor.

Having described my invention, what I claim as new and desire to protect by Letters Patent is:

1. The method of producing pan bread in the form of an elongated loaf consisting in forming a plurality of slender rolls of dough, twisting said rolls around each other, proofing the twisted product in a pan which confines it endwise and sidewise, whereby the cellular structure in the turns of each of the twisted rolls is stretched lengthwise of the turns and said turns reduced in pitch, and, finally, in baking the proofed product in said pan.

2. The method of producing a loaf of bread consisting in forming a plurality of rolls of dough, entwining said rolls about each other, proofing the product, confining it in the direction of progression of the turns of said rolls during proofing, whereby the cellular structure is stretched in the turns of the rolls lengthwise of said turns and said turns reduced in pitch, in baking the proofed product, and in confining it, during baking, against spreading, to further the stretching of the cellular structure lengthwise of the turns of said rolls.

3. A loaf of bread consisting of portions progressively entwined turn upon turn and formed from entwined rolls of dough proofed and baked in a pan, the extent of the loaf in the direction of progression of the turns of its entwined portions being substantially the same as that of the entwined rolls of dough before proofing, the cellular structure in said entwined portions being stretched lengthwise of their turns and compressed in the direction of progression thereof, said structure defining cells elongated in the direction of the length of the turns of said portions and of correspondingly reduced dimensions in the direction of progression of said turns.

In testimony whereof I have affixed my signature.

DELMAR M. BINGER.